(12) United States Patent
Johansson et al.

(10) Patent No.: US 7,526,021 B2
(45) Date of Patent: *Apr. 28, 2009

(54) TELECOMMUNICATIONS TRANSMISSION SYSTEMS

(75) Inventors: Magnus Johansson, Luleå (SE); Lennart Olsson, Luleå (SE); Gunnar Bahlenberg, Luleå (SE); Daniel Bengtsson, Luleå (SE); Mikael R. Isakssaon, Luleå (SE); Sven-Rune Olofsson, Luleå (SE); Sven Göeran Öckvist, Luleå (SE)

(73) Assignee: STMicroelectronics S.A., Montrouge (FR)

( * ) Notice: Subject to any disclaimer, the term of this patent is extended or adjusted under 35 U.S.C. 154(b) by 349 days.

This patent is subject to a terminal disclaimer.

(21) Appl. No.: 11/436,014

(22) Filed: May 17, 2006

(65) Prior Publication Data

US 2006/0209976 A1 Sep. 21, 2006

Related U.S. Application Data

(63) Continuation of application No. 09/700,617, filed as application No. PCT/SE99/00790 on May 11, 1999, now Pat. No. 7,079,610.

(30) Foreign Application Priority Data

May 18, 1998 (SE) .................................. 9801748

(51) Int. Cl.
*H03H 7/30* (2006.01)
*H03H 7/40* (2006.01)

(52) U.S. Cl. ..................... 375/229; 375/230; 375/231; 375/232; 375/233; 375/234; 375/235; 375/236

(58) Field of Classification Search ......... 375/229–236, 375/316, 295, 354
See application file for complete search history.

(56) References Cited

U.S. PATENT DOCUMENTS

| 3,879,664 | A |   | 4/1975 | Monsen |
| 5,444,697 | A | * | 8/1995 | Leung et al. ................. 370/207 |
| 5,652,772 | A |   | 7/1997 | Isaksson et al. |

(Continued)

OTHER PUBLICATIONS

International Search Report from PCT/SE 99/00790, filed Nov. 5, 1999.

(Continued)

*Primary Examiner*—Chieh M Fan
*Assistant Examiner*—Jason M. Perilla
(74) *Attorney, Agent, or Firm*—Lisa K. Jorgenson; William R. McClellan; Wolf, Greenfield & Sacks, P.C.

(57) ABSTRACT

In a multi-carrier system employing OFDM, for example DMT, an adaptive channel equalizer is normally used, operating in the frequency domain. The sampling clock is controlled so that the time delay between the transmitter and the receiver is effectively eliminated. If the information used to control the sampling clock is received from the equalized data stream, it will introduce an ambiguity between the operation of the channel equalizer and the mechanism used to control the sampling clock. Operation of the equalizer can mask an increasing time difference, between transmitter and receiver, which the sample clock controller should be tracking. The present invention eliminates the ambiguities in the operation of the equalizer and sample clock controller by preventing the equalizer accepting time differences which should be corrected by operation of the sample clock controller.

36 Claims, 2 Drawing Sheets

U.S. PATENT DOCUMENTS

| | | | | |
|---|---|---|---|---|
| 5,802,117 | A * | 9/1998 | Ghosh | 375/344 |
| 5,835,538 | A * | 11/1998 | Townshend | 375/295 |
| 5,949,820 | A * | 9/1999 | Shih et al. | 375/229 |
| 6,539,063 | B1 * | 3/2003 | Peyla et al. | 375/267 |
| 6,546,063 | B1 * | 4/2003 | Lee et al. | 375/346 |
| 6,625,112 | B1 * | 9/2003 | Olsson et al. | 370/206 |
| 6,751,261 | B1 * | 6/2004 | Olsson et al. | 375/260 |
| 6,876,675 | B1 * | 4/2005 | Jones et al. | 370/509 |
| 6,928,046 | B1 * | 8/2005 | Sajadieh et al. | 370/203 |
| 6,993,084 | B1 * | 1/2006 | Eberlein et al. | 375/260 |
| 6,993,094 | B1 * | 1/2006 | Eberlein et al. | 375/326 |
| 7,023,938 | B1 * | 4/2006 | Kapoor et al. | 375/350 |
| 7,061,997 | B1 * | 6/2006 | Eberlein et al. | 375/332 |
| 7,079,610 | B1 * | 7/2006 | Johansson et al. | 375/350 |
| 2006/0209976 | A1 * | 9/2006 | Johansson et al. | 375/260 |

OTHER PUBLICATIONS

International Preliminary Examination Report from PCT/SE 99/00790, filed Nov. 5, 1999.

*An Implementation of ODFM Receiver For Digital Terrestrial Television Broadcasting And Its Technologies*, Harada, Y et al., Broadcasting Convention 1997, pp. 337-342.

IEEE Comm. Mag., pp. 100-109, vol. 33, No. 2, Feb. 1995, H.Sari, et al., *Transmission Techniques for Digital Terrestrial TV Broadcasting*.

*Low-Complex Frame Synchronizationi in OFDM Systems*, van de Beek et al., Universal Personal Comm., 1995, Record 1995 Fourth IEEE International Conf. on pp. 982-986.

* cited by examiner

CE = Cyclic Extension

TELECOMMUNICATIONS TRANSMISSION SYSTEMS

CROSS REFERENCE TO RELATED APPLICATIONS

This application is a continuation of application Ser. No. 09/700,617, filed Mar. 22, 2001, entitled IMPROVEMENTS IN, OR RELATING TO, TELECOMMUNICATIONS TRANSMISSION SYSTEMS, which prior application is incorporated herein by reference.

FIELD OF THE INVENTION

The present invention relates to multi-carrier telecommunications transmission systems employing OFDM (Orthogonal Frequency Division Multiplexing), receivers for us in multi-carrier telecommunications transmission systems, and methods of maintaining sampling clock synchronisation between a transmitter sampling clock and a receiver sampling clock in multi-carrier telecommunications transmission systems.

BACKGROUND OF THE INVENTION

In a multi-carrier system of the OFDM type, including DMT (Discrete MultiTone), the control of a receiver's sampling clock and the updating of the equalizer's parameters may, in some cases, interfere. The present invention coordinates the equalizer's function and control of the sampling clock, in a new way, such that this problem is eliminated.

SUMMARY OF THE INVENTION

In a multi-carrier system employing OFDM, for example DMT, an adaptive channel equalizer is normally used, operating in the frequency domain. The internal parameters on which such equalizers operate include, in addition to data relating to the characteristics of the channel, information that defines a time delay between the transmitter and receiver sampling clock. The sampling clock is controlled so that the time delay between the transmitter and the receiver is effectively eliminated. If the information used to control the sampling clock is received from the equalized data stream, it will introduce an ambiguity between the operation of the channel equalizer and the mechanism used to control the sampling clock. In particular, it will not be clear to what extent the time delays between the transmitter and receiver have been eliminated by the sampling clock and/or by the equalizer. Operation of the equalizer can mask an increasing time difference, between transmitter and receiver, which the sample clock controller should be tracking. This may lead to a situation where the sampling of one frame, in the time domain, occurs at a time which is so long after the correct time period that inter symbol interference occurs. The present invention eliminates the ambiguities in the operation of the equalizer and sample clock controller by preventing the equalizer accepting time differences which should be corrected by operation of the sample clock controller. The method of the present invention incorporates a modified algorithm for updating the equalizer's parameters.

The present invention may be used in, for example, ADSL and VDSL systems employing DMT which have relatively stationary channels. The principle, however, has general application and may be used, with advantage, in mobile and semi-mobile systems such as DECT and GSM.

According to a first aspect of the present invention, there is provided a receiver, for use in an OFDM transmission system, having an adaptive channel equalizer means, a sampling clock and a sampling clock control means characterised in that ambiguity prevention means are provided to prevent said adaptive channel equalizer means from operating on time differences which should be corrected by operation of said sampling clock control means.

Said sampling clock may be controlled by data derived from an equalized data stream.

Sampling time deviations in said OFDM system may cause received frame argument functions to have a linear slope and said sampling clock may be controlled using an estimate of said frame argument functions' slope.

Said adaptive channel equalizer may be prevented from operating on said time differences by forcing the slope of a linear part of an equalizer parameter argument function to be always zero.

Said sampling clock's frequency may be controlled by a feed-back signal generated from an estimated slope of an argument function, $Y^*U$ which is the element-by-element product of an equalizer output vector U and the conjugate of a quantized vector Y derived from an output of a detector means operating on U.

A slope of said equalizer parameter argument function may be derived by taking an average slope of the equalizer parameter argument function by unwrapping said equalizer parameter argument function and deriving said average slope from said unwrapped equalizer parameter argument function.

The average slope $\alpha_k$, of the linear part of the equalizer parameter argument function may be calculated from:

$$\alpha_k = \frac{1}{N} \sum_n \frac{\angle EQ_{n,k}}{n} \tag{1a}$$

where $\angle EQ$ is the unwrapped equalizer parameter argument function, n is the carrier index, k is the frame number and N is the size of the frequency domain frame.

The average slope $\alpha_k$ of the linear part of the equalizer parameter argument function may be calculated from:

$$\alpha_k = \frac{2}{n_2 - n_0} \left( \sum_{n=n_1=1}^{n_2} \angle EQ_{n,k} - \sum_{n=n_0}^{n_1} \angle EQ_{n,k} \right) \tag{1b}$$

where $\angle EQ$ is the unwrapped equalizer parameter argument function, n is the carrier index, k is the frame number, N is the size of the frequency domain frame, $n_1$ divides the received frequency band into two equal parts and $n_0$ and $n_2$ are lower and upper limits, respectively, of the frequency band.

Where several separate frequency bands are present in the received signal, equation 1 (b) may be applied to each frequency band separately and the average of the results employed as the slope of the equalizer parameter argument function.

Said equalizer parameter argument function may be rotated in small steps until said slope is zero.

Said rotation may be performed by using a vector L of complex numbers with unit magnitude and a linear argument function with a slope equal to a small fraction $\alpha_k$, and in that L is calculated from:

$$L_{n,k} = \exp\left(-j \cdot \beta \cdot \frac{n}{N} \cdot \alpha_k\right) \quad (2)$$

where β controls the speed of adaption to the zero slope.

An equaliser parameter vector EQ may be adaptively updated using an algorithm defined by:

$$EQ_{n,k+1} = \left[EQ_{n,k} + \mu_1 \cdot \frac{X_{n,k}^*}{|X_{n,k}|^2} \cdot (Y_{n,k} - U_{n,k})\right] \cdot L_{n,k} \quad (3a)$$

An equaliser parameter vector EQ may be adaptively updated using an algorithm defined by:

$$EQ_{n,k+1} = \left[EQ_{n,k} + \mu_2 \cdot \frac{X_{n,k}^*}{|X_{n,k}|} \cdot (Y_{n,k} - U_{n,k})\right] \cdot L_{n,k} \quad (3b)$$

An equaliser parameter vector EQ may be adaptively updated using an algorithm defined by:

$$EQ_{n,k+1} = [EQ_{n,k} + \mu_3 \cdot X^*_{n,k} \cdot (Y_{n,k})] \cdot L_{n,k} \quad (3c)$$

The algorithm defined by equation 3(a) may be employed during a start up sequence for said receiver.

The algorithm defined by equation 3(c) may be used for tracking slow changes in the adaptive equaliser parameter EQ subsequent to a start up sequence for said receiver.

Said OFDM system may employ DMT.

Said OFDM system may be an ADSL system.

Said OFDM system may be a VDSL system.

Said OFDM system may be a mobile telecommunications system.

According to a second aspect of the present invention, there is provided an OFDM multi-carrier transmission system having at least one transmitter and a plurality of receivers, characterised in that said receivers are receivers as set forth in any preceding paragraph.

According to a third aspect of the present invention, there is provided a transceiver, for use in an OFDM transmission system, characterised in that said transceiver includes a receiver as set forth in any preceding paragraph.

According to a fourth aspect of the present invention, there is provided, in an OFDM transmission system having a transmitter and a receiver, said receiver having an adaptive channel equalizer means, a sampling clock and a sampling clock control means, and said transmitter having a sampling clock, a method of maintaining synchronisation between said receiver sampling clock and said transmitter sampling clock, characterised by preventing said adaptive channel equalizer means from operating on time differences which should be corrected by operation of said sampling clock control means.

Said sampling clock may be controlled by data derived from an equalized data stream.

Sampling time deviations in said OFDM system may cause received frame argument functions to have a linear slope and said sampling clock may be controlled using an estimate of said frame argument functions' slope.

Said adaptive channel equalizer may be prevented from operating on said time differences by forcing the slope of a linear part of an equalizer parameter argument function to be always zero.

Said sampling clock's frequency may be controlled by a feed-back signal generated from an estimated slope of an argument function, Y˜U which is the element-by-element product of an equalizer output vector U and the conjugate of a quantized vector Y derived from an output of a detector means operating on U.

A slope of said equalizer parameter argument function may be derived by taking an average slope of the equalizer parameter argument function by unwrapping said equalizer parameter argument function and deriving said average slope from said unwrapped equalizer parameter argument function.

The average slope $\alpha_k$ of the linear part of the equalizer parameter argument function may be calculated from:

$$\alpha_k = \frac{1}{N} \sum_n \frac{\angle EQ_{n,k}}{n} \quad (1a)$$

where ∠EQ is the unwrapped equalizer parameter argument function, n is the carrier index, k is the frame number and N is the size of the frequency domain frame.

The average slope $\alpha_k$ of the linear part of the equalizer parameter argument function may be calculated from:

$$\alpha_k = \frac{2}{n_2 - n_0}\left(\sum_{n=n_1+1}^{n_2} \angle EQ_{n,k} - \sum_{n=n_0}^{n_1} \angle EQ_{n,k}\right) \quad (1b)$$

where ∠EQ is the unwrapped equalizer parameter argument function, n is the carrier index, k is the frame number, N is the size of the frequency domain frame n, divides the received frequency band into two equal parts and $n_0$ and $n_2$ are lower and upper limits, respectively, of the frequency band.

Where several separate frequency bands are present in the received signal, equation 1 (b) may be applied to each frequency band separately and the average of the results employed as the slope of the equalizer parameter argument function.

Said equalizer parameter argument function may be rotated in small steps until said slope is zero.

Said rotation may be performed by using a vector L of complex numbers with unit magnitude and a linear argument function with a slope equal to a small fraction $\alpha_k$, and in that L is calculated from:

$$L_{n,k} = \exp\left(-j \cdot \beta \cdot \frac{n}{N} \cdot \alpha_k\right) \quad (2)$$

where β controls the speed of adaption to the zero slope.

An equaliser parameter vector EQ may be adaptively updated using an algorithm defined by:

$$EQ_{n,k+1} = \left[EQ_{n,k} + \mu_1 \cdot \frac{X_{n,k}^*}{|X_{n,k}|^2} \cdot (Y_{n,k} - U_{n,k})\right] \cdot L_{n,k} \quad (3a)$$

An equaliser parameter vector EQ may be adaptively updated using an algorithm defined by:

$$EQ_{n,k+1} = \left[EQ_{n,k} + \mu_2 \cdot \frac{X_{n,k}^*}{|X_{n,k}|} \cdot (Y_{n,k} - U_{n,k})\right] \cdot L_{n,k} \quad (3b)$$

An equaliser parameter vector EQ may be adaptively updated using an algorithm defined by:

$$EQ_{n,k+1} = [EQ_{n,k} + \mu_3 \cdot X^*_{n,k} \cdot (Y_{n,k})] \cdot L_{n,k} \qquad (3c)$$

The algorithm defined by equation 3(a) may be employed during a start up sequence for said receiver.

The algorithm defined by equation 3(c) may be used for tracking slow changes in the adaptive equaliser parameter EQ subsequent to a start up sequence for said receiver.

Said OFDM system may employ DMT.

Said OFDM system may be an ADSL system.

Said OFDM system may be a VDSL system.

Said OFDM system may be a mobile telecommunications system.

BRIEF DESCRIPTION OF THE DRAWINGS

Embodiments of the invention will now be described, by way of example, with reference to the accompanying drawings, in which.

DETAILED DESCRIPTION

In a multi-carrier system employing OFDM, for example DMT, an adaptive channel equalizer is normally used, operating in the frequency domain. The equalizer operates on, inter alia, parameters which define the time delay between the transmitter and receiver sampling clocks. The sampling clock, however, must be controlled so that the time delay between the transmitter and the receiver is effectively eliminated. If the information used to control the sampling clock is received from the equalized data stream, there will be an ambiguity between the operation of the channel equalizer and the sampling clock control mechanism. In particular, it will not be clear to what extent time delays between the transmitter and receiver have been eliminated by operation of the sampling clock control mechanism, or the equaliser. Operation of the equalizer can thus mask an increasing time difference, between transmitter and receiver, which the sample clock controller should track. This can lead to a situation where the sampling of one frame, in the time domain, occurs at a time, which is so long after the correct time period, that inter symbol interference occurs. The present invention eliminates the ambiguities in the operation of the equaliser and sample clock controller by preventing the equalizer accepting time differences which should be corrected by operation of the sample clock controller.

A sampling time deviation in an OFDM system causes the received frame argument function to have a linear slope. The sampling clock oscillator is, therefore, controlled using an estimate of this slope. The estimation of the argument function is performed using equalized data. Since the equalizer adapts to the channel properties, it also eliminates any sampling time deviations. This means that the equalizer and the sampling clock control may mutually cancel each other out, in respect of sampling time deviations. Since the frame timing is set during the start-up sequence, it also relies on these control actions. It is, therefore, necessary to prevent such mutual cancellation.

The method of the present invention solves the mutual cancellation problem by preventing the equalizer from operating on the time delay. This means that the slope of the linear part of the equalizer parameter argument function is always substantially zero. An adaptive parameter estimation algorithm that fulfils this requirement is incorporated in the present invention.

Figure 1:
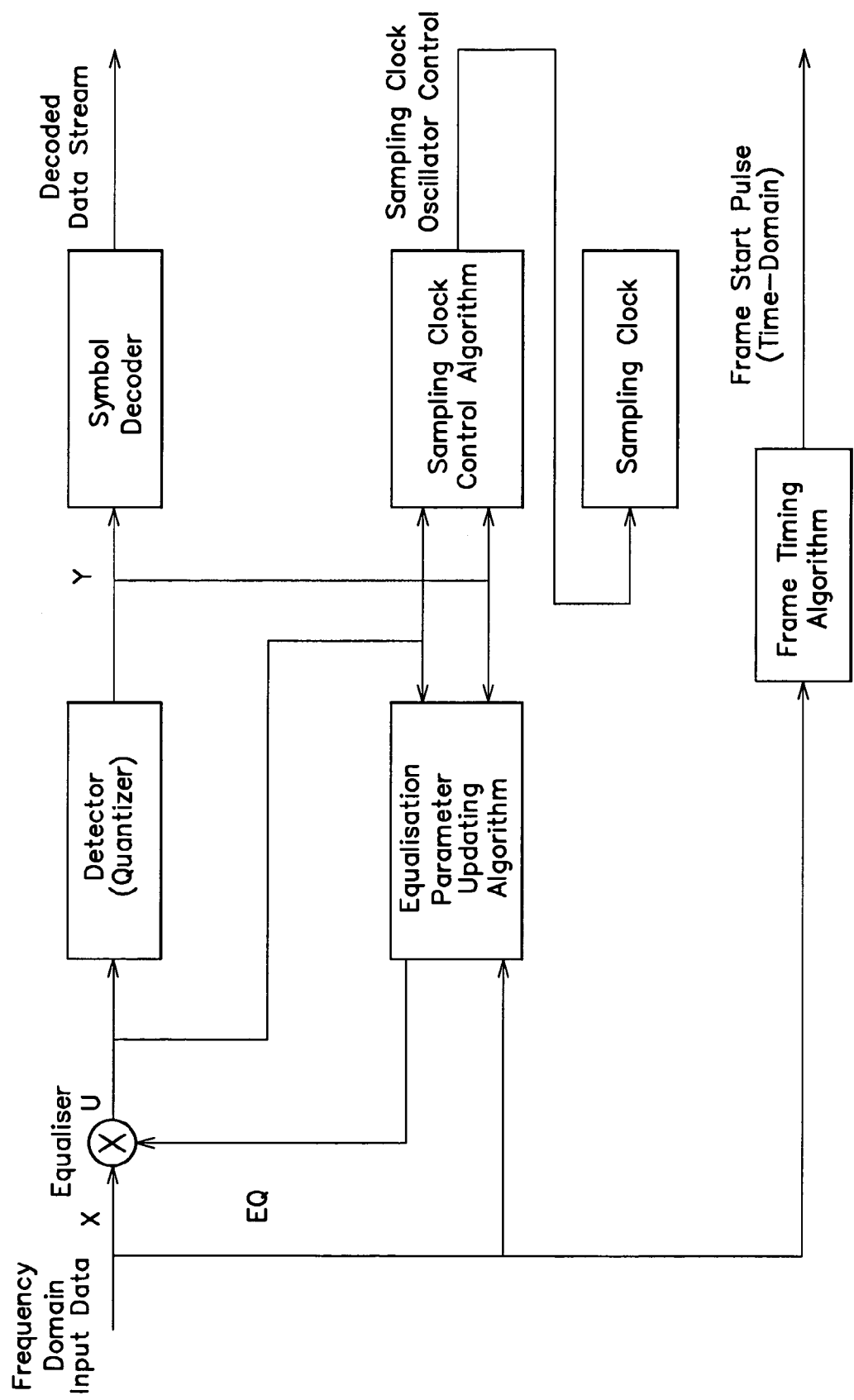
FIG. 1 illustrates, in block schematic form, the equalizer and sampling clock control unit of a receiver according to the present invention.

FIG. 1 illustrates an OFDM receiver, according to the present invention. Incoming frequency domain data, X, passes to an equalizer and then, as an equalized signal, to a detector, i.e. a quantizer. The output from the detector is passed to a symbol detector from which a decoded data stream emerges. Frame start pulses, in the time domain, are derived from a frame timing algorithm which operates on the received frequency domain input data and runs in a frame timing mechanism. The equalizer is controlled by an equalisation parameter updating algorithm which operates on the frequency domain input data and an output derived from the sampling clock control algorithm. The equaliser is controlled by signal EQ.

The sampling clock control algorithm, which operates in the sampling clock control mechanism, produces a signal for controlling the sampling clock oscillator.

The frequency-domain data is the Fourier transform of the received time domain OFDM frames. The time-domain frames are sampled in synchronism with the transmitter so that each received frame contains data from only one transmitted frame. This is important in order to maintain the orthogonality of the frames.

Figure 2:
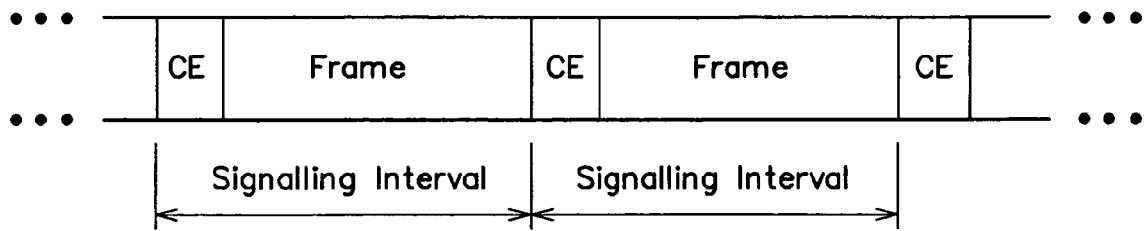
FIG. 2 illustrates the time domain data format for OFDM.

A common time-domain format for the transmission of OFDM frames, is illustrated in FIG. 2, where CE=Cyclic Extension.

Figure 3:
FIG. 3 illustrates an OFDM multi-carrier transmission system including a transmitter and a plurality of receivers.

An OFDM multi-carrier transmission system including a transmitter and a plurality of receivers is shown in FIG. 3.

Figure 4:
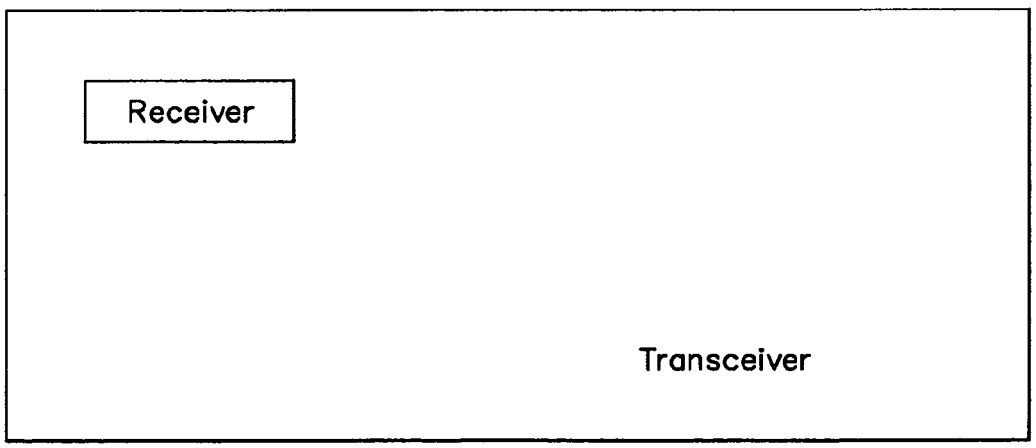
FIG. 4 illustrates a transceiver that includes an OFDM receiver.

A transceiver including an OFDM receiver is shown in FIG. 4.

The signalling interval contains a cyclic extension and a frame. The cyclic extension is a copy of the opposite part of the frame. This means that a frame sampled anywhere inside the signalling interval will contain data from one transmitted frame only, in the correct order. A deviation from the exact frame timing leads to a cyclic permutation of the frame, but the orthogonality is still maintained. The cyclic extension may be split into two parts, namely a prefix part and a suffix part.

A training procedure is required at start-up. The frame timing is adjusted until the received frames are sampled within the frame interval. The sampling clock frequency must also be adjusted so that it is sufficiently close to the transmitter clock frequency to enable the equalizer to estimate a fairly stable set of parameters.

The generation of frame start pulses is achieved by counting sampling clock intervals. Therefore, after the initial setting of the sampling clock timing during the training procedure, maintenance of synchronisation between a receiver and a transmitter will be dependent on the feed-back control of the sampling clock oscillator. The clock oscillator frequency is controlled by a feed-back signal generated from the estimated slope of the argument function of vector $Y\ast U$; which is the element-by-element product of the conjugate of the quantized vector Y and the equalizer output vector U.

After the training procedure the equalizer parameters EQ will represent the complex frequency-domain inverse of the channel. The product vector $Y\ast U$ will then have an argument function with a slope representing the time deviation between the transmitter and receiver sample timing. However, the argument function of EQ may also have a linear part with non-zero slope unless measures are taken to prevent this occurring. This also corresponds to a deviation between the transmitter and receiver sample timing. Since the vector EQ represents the inverse channel, the slope of EQ has the opposite sign to the slope of Y*U for the same time deviation. Therefore, they may become large and still cancel each other out. This is a potential problem, since the frame timing can gradually drift away from the frame interval and inter-symbol interference will eventually increase.

The solution to this problem, proposed by the present invention, is to prevent the equalizer parameter vector EQ from representing time delay. This means that the linear part of its argument function must be forced to zero slope.

The sample time deviation will then be represented by the argument function slope of Y*U and taken care of by the sampling clock oscillator feed-back controller.

The equalizer parameter estimation is performed adaptively using, as input data, the frequency-domain vectors X, U and Y, see FIG. 1. During the first part of the start-up sequence, the vector Y is temporarily replace by a training frame T with known content. In the equations, set out in this patent specification, k is the frame number, n is the carrier index and N is the size of the frequency-domain frame.

The novel feature of the algorithm employed by the present invention is that any non-zero time delay representation included in the equalizer parameter vector EQ will be eliminated.

The exact linear argument function representing the time delay is not available, but an approximation can be estimated. The argument function of the equalizer parameter vector is generally non-linear, but a linear part can be found by taking the average slope of the argument function. This means that the unwrapped argument function has to be calculated and the average slope of this used as a measure of the time delay. Thus, the algorithm will use this as a feedback value to successively rotate the argument function in small steps until the average slope is zero.

The argument function of the equalizer parameters is the vector of arguments of the individual complex elements. The argument of a complex number is the inverse tangent of the imaginary part divided by the real part. A problem involved in this calculation is that the inverse tangent function is periodic with a period 2n radians. In this application it is necessary to handle larger arguments than n radians, which is the range of the inverse tangent function. An assumption used here is that the difference in argument between adjacent parameters is smaller than n radians. It is then possible to compensate for each discontinuity due to the inverse tangent function periodicity and thus unwrap the argument function.

The average slope $\alpha_k$ of the linear part can be calculated as shown in Equation (1a), or by some other standard method, using the unwrapped argument function of EQ.

$$\alpha_k = \frac{1}{N} \sum_n \frac{\angle EQ_{n,k}}{n} \quad (1a)$$

If the lowest frequency carriers are not present in the frame, it is not possible to find the true argument function since there will be an unknown starting value for the available part of the function. This is not a problem in the present application, since the average slope can still be calculated.

Equation (1b) shows an alternative algorithm that gives the average slope of a contiguous band of active carriers.

$$\alpha_k = \frac{2}{n_2 - n_0} \left( \sum_{n=n_1+1}^{n_2} \angle EQ_{n,k} - \sum_{n=n_0}^{n_1} \angle EQ_{n,k} \right) \quad (1b)$$

Indexes no and n2 are the lower and upper limits respectively of the band. Index n, divides the band into two equal parts. If several separate bands are used, equation (1 b) is applied to each band and the average of the results is calculated.

The algorithm according to equation (1b) gives a very simple hardware implementation.

The rotation operation is performed using a vector L of complex numbers with unit magnitude and a linear argument function with a slope equal to a small fraction of $\alpha_k$. The vector L is calculated using Equation (2).

$$L_{n,k} = \exp\left(-j \cdot \beta \cdot \frac{n}{N} \cdot \alpha_k\right) \quad (2)$$

The coefficient β controls the speed of adaption to the zero average slope of the EQ vector argument function.

Different algorithms for the adaptive updating of the equalizer parameter vector EQ are given by Equations (3a), (3b) and (3c). They all include the new feature to eliminate the time delay representation. One specific feature that characterises the present invention is the multiplication by the rotational vector L.

The algorithm according to Equation (3a) is the fastest approach, while Equation (3c), which is a modified LMS algorithm, has the best performance for low SNR. The selection is not obvious, but Equation (3a) can be used during part of the start-up sequence and Equation (3c) can be used for the tracking of subsequent slow changes.

$$EQ_{n,k+1} = \left[EQ_{n,k} + \mu_1 \cdot \frac{X^*_{n,k}}{|X_{n,k}|^2} \cdot (Y_{n,k} - U_{n,k})\right] \cdot L_{n,k} \quad (3a)$$

$$EQ_{n,k+1} = \left[EQ_{n,k} + \mu_2 \cdot \frac{X^*_{n,k}}{|X_{n,k}|} \cdot (Y_{n,k} - U_{n,k})\right] \cdot L_{n,k} \quad (3b)$$

$$EQ_{n,k+1} = [EQ_{n,k} + \mu_3 \cdot X^*_{n,k} \cdot (Y_{n,k})] \cdot L_{n,k} \quad (3c)$$

The main innovation of the present invention is the principle that the equalizer should be prevented from representing time delay.

The present invention can be realised as a method of implementing this principle as a part of the equalizer parameter updating algorithm.

The sample timing control using this method is very robust in the case of disturbances, since every active carrier is used in the timing deviation estimation.

What is claimed is:

1. A receiver, for use in an Orthogonal Frequency Division Multiplexing (OFDM) transmission system, comprising an adaptive channel equalizer means, detector means, equalization parameter updating means, a sampling clock and a sampling clock control means, the equalization parameter updating means responding to outputs of the detector means and the adaptive channel equalizer means to provide an equalizer parameter (EQ) to the adaptive channel equalizer means, the equalization parameter updating means including an ambiguity prevention mechanism to prevent said adaptive channel equalizer means from operating on time differences between the receiver and a transmitter which should be corrected by operation of said sampling clock control means, the equalizer parameter having an equalizer parameter argument function, wherein said equalizer parameter argument function is rotated in small steps until a slope of a linear part of the equalizer parameter argument function is zero.

2. A receiver, as claimed in claim 1, wherein said adaptive channel equalizer means provides an equalized data stream and wherein said sampling clock is controlled by data derived from the equalized data stream.

3. A receiver, as claimed in claim 1, wherein the slope of said equalizer parameter argument function is derived by taking an average slope of the equalizer parameter argument function by unwrapping said equalizer parameter argument function and deriving said average slope from said unwrapped equalizer parameter argument function.

4. A receiver, as claimed in claim 3, wherein the average slope $\alpha_k$ of the linear part of the equalizer parameter argument function is calculated from:

$$\alpha_k = \frac{1}{N} \sum_n \frac{\angle EQ_{n,k}}{n} \qquad (1a)$$

where $\angle EQ$ is the unwrapped equalizer parameter argument function, n is a carrier index, k is a frame number and N is a size of a received frequency band.

5. A receiver, as claimed in claim 3, wherein the average slope $\alpha_k$ of the linear part of the equalizer parameter argument function is calculated from:

$$\alpha_k = \frac{2}{n_2 - n_0} \left( \sum_{n=n_1+1}^{n_2} \angle EQ_{n,k} - \sum_{n=n_0}^{n_1} \angle EQ_{n,k} \right) \qquad (1b)$$

where $\angle EQ$ is the unwrapped equalizer parameter argument function, n is a carrier index, k is a frame number, N is a size of a received frequency band, $n_1$ divides the received frequency band into two equal parts, and $n_0$ and $n_2$ are lower and upper limits, respectively, of the received frequency band.

6. A receiver, as claimed in claim 5, wherein an input to the adaptive channel equalizer means represents a received signal and wherein, where several separate frequency bands are present in the received signal, the equation (1b) is applied to each frequency band separately and the average of the results employed as the slope of the equalizer parameter argument function.

7. A receiver, as claimed in claim 1, wherein said rotation is performed by using a vector L of complex numbers with unit magnitude and a linear argument function with a slope equal to a small fraction of the average slope $\alpha_k$, and wherein L is calculated from:

$$L_{n,k} = \exp\left(-j \cdot \beta \cdot \frac{n}{N} \cdot \alpha_k\right) \qquad (2)$$

where $\beta$ controls the speed of adaptation to the zero slope, n is a carrier index and N is a size of a received frequency band.

8. A receiver, as claimed in claim 1, wherein the equalizer parameter EQ is adaptively updated using an algorithm defined by:

$$EQ_{n,k+1} = \left[ EQ_{n,k} + \mu_1 \cdot \frac{X_{n,k}^*}{|X_{n,k}|^2} \cdot (Y_{n,k} - U_{n,k}) \right] \cdot L_{n,k} \qquad (3a)$$

where n is a carrier index, k is a frame number, $\mu_1$ is a first coefficient, X is a frequency domain input data, $Y_{n,k}$ is a quantized vector, $U_{n,k}$ is an equalizer output vector and $L_{n,k}$ is a vector of complex numbers with unit magnitude and a linear argument function with a slope equal to a small fraction of the average slope.

9. A receiver, as claimed in claim 1, wherein the equalizer parameter EQ is adaptively updated using an algorithm defined by:

$$EQ_{n,k+1} = \left[ EQ_{n,k} + \mu_2 \cdot \frac{X_{n,k}^*}{|X_{n,k}|} \cdot (Y_{n,k} - U_{n,k}) \right] \cdot L_{n,k} \qquad (3b)$$

where n is a carrier index, k is a frame number, $\mu_2$ is a second coefficient, X is a frequency domain input data, $Y_{n,k}$ is a quantized vector, $U_{n,k}$ is an equalizer output vector and $L_{n,k}$ is a vector of complex numbers with unit magnitude and a linear argument function with a slope equal to a small fraction of the average slope.

10. A receiver, as claimed in claim 1, wherein the equalizer parameter EQ is adaptively updated using an algorithm defined by:

$$EQ_{n,k+1} = [EQ_{n,k} + \mu_3 \cdot X^*_{n,k} \cdot (Y_{n,k})] \cdot L_{n,k} \qquad (3c)$$

where n is a carrier index, k is a frame number, $\mu_3$ is a third coefficient, X is a frequency domain input data and $L_{n,k}$ is a vector of complex numbers with unit magnitude and a linear argument function with a slope equal to a small fraction of the average slope.

11. A receiver, as claimed in claim 8, wherein the algorithm defined by equation (3a) is employed during a start up sequence for said receiver.

12. A receiver, as claimed in claim 10, wherein the algorithm defined by equation (3c) is used for tracking slow changes in the equalizer parameter EQ subsequent to a start up sequence for said receiver.

13. A receiver, as claimed in claim 1, wherein said OFDM transmission system employs Discrete Multi Tone (DMT).

14. A receiver, as claimed in claim 1, wherein said OFDM transmission system is an Asymmetric Digital Subscriber Line (ADSL) system.

15. A receiver, as claimed in claim 1, wherein said OFDM transmission system is a Very high data rate Digital Subscriber Line (VDSL) system.

16. A receiver, as claimed in claim 1, wherein said OFDM transmission system is a mobile telecommunications system.

17. An OFDM multi-carrier transmission system having at least one transmitter and a plurality of receivers, wherein each of the plurality of receivers is the receiver as claimed in claim 1.

18. A transceiver, for use in the OFDM transmission system, wherein said transceiver includes the receiver as claimed in claim 1.

19. In an Orthogonal Frequency Division Multiplexing (OFDM) transmission system having a transmitter and a receiver, said receiver having an adaptive channel equalizer, a detector, a sampling clock and a sampling clock controller, and said transmitter having a sampling clock, a method of maintaining synchronization between said receiver sampling clock and said transmitter sampling clock, comprising the steps of:

preventing said adaptive channel equalizer from operating on time differences between the receiver and the transmitter which should be corrected by operation of said sampling clock controller; and controlling said adaptive channel equalizer with an equalizer parameter having an equalizer parameter argument function, the step of controlling comprising a step of rotating said equalizer parameter argument function in small steps until a slope of a linear part of the equalizer parameter argument function is zero.

20. A method, as claimed in claim 19, wherein said adaptive channel equalizer provides an equalized data stream, further comprising the step of controlling said receiver sampling clock with data derived from the equalized data stream.

21. A method, as claimed in claim 19, the step of preventing comprising the step of deriving the slope of said equalizer parameter argument function by taking an average slope of the equalizer parameter argument function by unwrapping said equalizer parameter argument function and deriving said average slope from said unwrapped equalizer parameter argument function.

22. A method, as claimed in claim 21, the step of deriving the slope comprising the step of calculating the average slope $\alpha_k$ of the linear part of the equalizer parameter argument function from:

$$\alpha_k = \frac{1}{N} \sum_n \frac{\angle EQ_{n,k}}{n} \tag{1a}$$

where $\angle EQ$ is the unwrapped equalizer parameter argument function, n is a carrier index, k is a frame number and N is a size of a received frequency band.

23. A method, as claimed in claim 21, the step of deriving the slope comprising the step of calculating the average slope $\alpha_k$ of the linear part of the equalizer parameter argument function from:

$$\alpha_k = \frac{2}{n_2 - n_0}\left(\sum_{n=n_1=1}^{n_2} \angle EQn, k - \sum_{n=n_0}^{n_1} \angle EQ_{n,k}\right) \tag{1b}$$

where $\angle EQ$ is the unwrapped equalizer parameter argument function, n is a carrier index, k is a frame number, N is a size of a received frequency band, $n_1$ divides the received frequency band into two equal parts, and $n_0$ and $n_2$ are lower and upper limits, respectively, of the received frequency band.

24. A method, as claimed in claim 23, wherein an input to the adaptive channel equalizer represents a received signal, the step of calculating the average slope comprising, where several separate frequency bands are present in the received signal, the step of applying equation (1b) to each frequency band separately and employing the average of the results as the slope of the equalizer parameter argument function.

25. A method, as claimed in claim 19, the step of rotating comprising the step of performing said rotation by using a vector L of complex numbers with unit magnitude and a linear argument function with a slope equal to a small fraction of the average slope $\alpha_k$, and calculating L from:

$$L_{n,k} = \exp\left(-j \cdot \beta \cdot \frac{n}{N} \cdot \alpha_k\right) \tag{2}$$

where β controls the speed of adaptation to the zero slope.

26. A method, as claimed in claim 19, further comprising the step of updating the equalizer parameter EQ adaptively using an algorithm defined by:

$$EQ_{n,k+1} = \left[EQ_{n,k} + \mu_1 \cdot \frac{X^*_{n,k}}{|X_{n,k}|^2} \cdot (Y_{n,k} - U_{n,k})\right] \cdot L_{n,k} \tag{3a}$$

where n is a carrier index, k is a frame number, $\mu_1$ is a first coefficient, X is a frequency domain input data, $Y_{n,k}$ is a quantized vector, $U_{n,k}$ is an equalizer output vector and $L_{n,k}$ is a vector of complex numbers with unit magnitude and a linear argument function with a slope equal to a small fraction of the average slope.

27. A method, as claimed in claim 19, further comprising the step of updating the equalizer parameter EQ adaptively using an algorithm defined by:

$$EQ_{n,k+1} = \left[EQ_{n,k} + \mu_2 \cdot \frac{X^*_{n,k}}{|X_{n,k}|} \cdot (Y_{n,k} - U_{n,k})\right] \cdot L_{n,k} \tag{3b}$$

where n is a carrier index, k is a frame number, $\mu_2$ is a second coefficient, X is a frequency domain input data, $Y_{n,k}$ is a quantized vector, $U_{n,k}$ is an equalizer output vector and $L_{n,k}$ is a vector of complex numbers with unit magnitude and a linear argument function with a slope equal to a small fraction of the average slope.

28. A method, as claimed in claim 19, further comprising the step of updating the equalizer parameter EQ adaptively using an algorithm defined by:

$$EQ_{n,k+1} = [EQ_{n,k} + \mu_3 \cdot X^*_{n,k} \cdot (Y_{n,k})] \cdot L_{n,k} \tag{3c}$$

where n is a carrier index, k is a frame number, $\mu_3$ is a third coefficient, X is a frequency domain input data and $L_{n,k}$ is a vector of complex numbers with unit magnitude and a linear argument function with a slope equal to a small fraction of the average slope.

29. A method, as claimed in claim 26, the step of updating comprising employing the algorithm defined by equation (3a) during a start up sequence for said receiver.

30. A method, as claimed in claim 28, the step of updating comprising using the algorithm defined by equation (3c) for tracking slow changes in the equalizer parameter EQ subsequent to a start up sequence for said receiver.

31. A method, as claimed in claim 19, wherein said OFDM transmission system employs Discrete Multi Tone (DMT).

32. A method, as claimed in claim 22, wherein said OFDM transmission system is an Asymmetric Digital Subscriber Line (ADSL) system.

33. A method, as claimed in claim 22, wherein said OFDM transmission system is a Very high data rate Digital Subscriber Line (VDSL) system.

34. A method, as claimed claim 22, wherein said OFDM transmission system is a mobile telecommunications system.

35. A receiver for use in an Orthogonal Frequency division Multiplexing (OFDM) transmission system, comprising:

an adaptive channel equalizer for receiving frequency domain input data and producing an equalized signal;

a detector for quantizing the equalized signal and producing a quantized signal;

a sampling clock;

a sampling clock controller for controlling the sampling clock in response to the equalized signal and the quantized signal; and an equalization controller for controlling the adaptive channel equalizer in response to the frequency domain input data, the equalized signal and the quantized signal, the equalization controller including an ambiguity prevention mechanism for preventing the adaptive channel equalizer from operating on time differences between the receiver and a transmitter which are corrected by operation of the sampling clock controller, wherein the equalization controller provides an equalization parameter having an equalization parameter argument function, wherein said equalizer parameter argument function is rotated in small steps until a slope of a linear part of the equalizer parameter argument function is zero.

36. In an Orthogonal Frequency division Multiplexing (OFDM) transmission system having a transmitter and a receiver, the receiver including an adaptive channel equalizer, a sampling clock and a sampling clock controller, and the transmitter including a sampling clock, a method in the receiver of maintaining sychronization between the receiver sampling clock and the transmitter sampling clock, the method comprising;

preventing the adaptive channel equalizer from operating on time differences between the receiver and the transmitter which are corrected by operation of the sampling clock controller;

controlling said adaptive channel equalizer with an equalizer parameter having an equalizer parameter argument function, the step of controlling comprising the step of rotating said equalizer parameter argument function in small steps until a slope of a linear part of the equalizer parameter argument function is zero.

* * * * *